Feb. 20, 1951 L. M. KEEFE 2,542,034
COIN CONTROLLED MECHANISM
Filed Jan. 24, 1944 6 Sheets-Sheet 1

INVENTOR
LINCOLN M. KEEFE
BY J. A. Grier
ATTORNEY

Feb. 20, 1951 L. M. KEEFE 2,542,034
COIN CONTROLLED MECHANISM
Filed Jan. 24, 1944 6 Sheets-Sheet 2

INVENTOR
LINCOLN M. KEEFE
BY J. A. Grier
ATTORNEY

INVENTOR.
LINCOLN M. KEEFE
BY J. A. Grier
ATTORNEY.

Feb. 20, 1951 — L. M. KEEFE — 2,542,034
COIN CONTROLLED MECHANISM
Filed Jan. 24, 1944 — 6 Sheets-Sheet 6

INVENTOR
LINCOLN M. KEEFE
BY J. A. Grier
ATTORNEY

Patented Feb. 20, 1951

2,542,034

UNITED STATES PATENT OFFICE 2,542,034

COIN CONTROLLED MECHANISM

Lincoln M. Keefe, Brooklyn, N. Y., assignor, by mesne assignments, to Stewart Products Corporation, a corporation of Delaware Application January 24, 1944, Serial No. 519,489

24 Claims. (Cl. 194—39)

This invention relates to improvements in coin controlled mechanisms and is directed more particularly to coin mechanisms actuated either by a coin or coins of one size, by a coin or coins of another size, or by combinations of coins of both sizes.

One object of the invention is the provision of a coin mechanism adapted to be actuated by coins of a plurality of values, singly, plurally or combinationally, said mechanism including a positionable member controlled thereby and adapted to be moved in steps to set up credits in accordance with the values of one or a plurality of coins inserted in said mechanism.

Another object of the invention is the provision of a coin device formed mainly of metal stampings, thereby producing, for mass production, a precision mechanism of few parts, light in weight and low in cost.

A further object of the invention is the provision of a coin device in which the moving parts are not only light in weight but also possess such great rigidity and strength that no means for adjusting said parts is necessary.

Yet another important object of the invention is the provision in a coin device of a first member to be actuated by coins of one value, and a second member to be actuated by coins of a multiple of said value, said members both being pivotally connected to a common floating support in spaced relation to each other, the spacing being of a ratio comparable to the values of the coins controlling said members, and the support being pivotally connected to a positionable member controlled thereby. This results in the pivotal connection with the second member forming a fulcrum for the support when the first member is being actuated, and the connection with the first member forming a fulcrum for the support when the second member is being actuated.

Another object of the invention is the provision, in a coin device, of a first member to be actuated by coins of one value, a second member to be actuated by coins of a different value, a positionable member to be moved in accordance with the value of the total coins actuating either one or both of said members, and a lever pivotally connected to all three of said members; the pivotal connection to said first member acting as a pivot about which the actuation of said second member causes said lever to move in one direction, and the pivotal connection to said second member acting as a pivot about which the actuation of said first member causes said lever to move in the opposite direction, said positionable member moving in one direction regardless of whether one or both of said first and second members is actuated.

A further object of the invention is the provision, in a coin device of a plurality of members to be actuated by coins of different values, a positionable member moved by said members a distance proportionate to the total value of the coins entered in said device, and a lever pivotally connected to all said first mentioned members and pivotally connected to said positionable member, none of said pivotal connections normally constituting a fulcrum until one of said first members is actuated by a coin, whereupon one of said pivotal connections other than the one connected to the member actuated, becomes the fulcrum.

Another object of the invention is the provision, in a coin device, of a first member to be actuated by coins of one value, a second member to be actuated by coins of another value, a positionable member to be controlled by said members, a bar pivotally connected to said first member at one point, pivotally connected to said second member at a second point spaced apart from said first point, and pivotally connected to said positionable member at a third point spaced apart from said second point, said bar normally serving to connect said members and being adapted to function as a lever of the first order when said first member is actuated and adapted to function as a lever of the third order when said second member is actuated.

Yet another object of the invention is the provision, in a coin device, of a first member, a second member and a positionable member controlled thereby, a bar pivotally connected to all said members, said first and second members being adapted to be actuated by coins, escapement means associated with both said first and said second members for causing them to move in increments or steps, said first member moving a single step for each actuation thereof by a coin and thereby causing said positionable member to move a single step, and said second member also moving a single step for each actuation thereof and causing said positionable member to move a plurality of steps.

Another object of the invention is the provision, of a coin mechanism including a member, means pivotally supporting said member, spring means urging said member longitudinally in one direction, a series of teeth on said member forming ratchet teeth, a rigid pawl, a second spring means urging said teeth into engagement with said pawl, means leading a coin to impactive engagement with said member to cause one of said teeth to move out of engagement with said pawl, permitting the member to move under the urge of said first spring means to a point where a second of said teeth engages said pawl; said mechanism also including means for preventing said member from moving more than one tooth space when actuated by a coin.

Another object of the invention is the provision of a coin mechanism having a chute for coins of one value and a second chute for coins of a greater value, a positionable member adapted to be moved along a fixed path in steps, spring means tending to urge said member along said path, means associated with said member and with said first chute normally holding said member against the urge of said spring means and being adapted, when actuated by a coin in said chute, to permit said member to advance along said path a predetermined distance.

Yet another object of the invention is the provision in a coin mechanism of a chute for coins of one value and a second chute for coins of a greater value, a positionable member movable along a definite path in steps, spring means tending to urge said member along said path, an actuatable member associated with said first chute, a second actuatable member associated with said second chute, a bar pivotally connecting all said members together, escapement means associated with said first and said second actuatable members and normally holding all said members against movement by said spring means, said actuatable members being adapted, each time either one of them is actuated by a coin, to move one notch and thereby permit said positionable member to move a step or steps proportionate to the value of the coin.

Other objects and advantages of the invention will unfold in the course of this specification and will be apparent to those skilled in the art.

Referring to the drawings which illustrate by way of example one embodiment of the invention.

Figure 2:
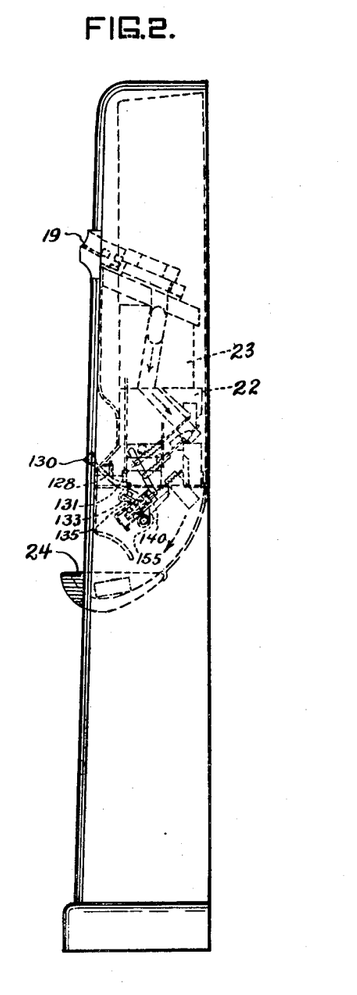
Figure 2 is a side elevation of the machine of Figure 1, showing the coin mechaism in dotted lines.
Figures 3, 4:
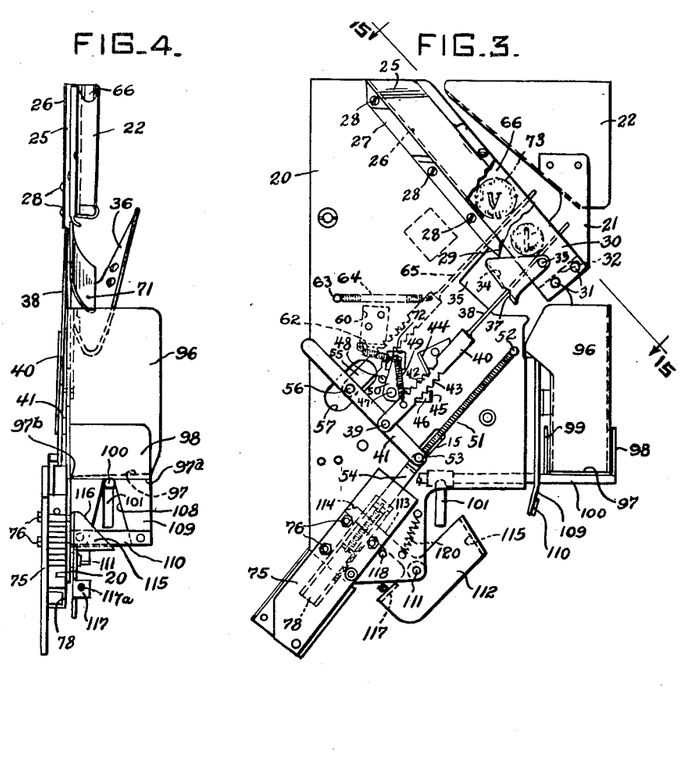
Figure 3 is a front elevation of the coin mechanism.
Figure 4 is a side elevation of the coin mechanism shown in Figure 3.
Figure 5:
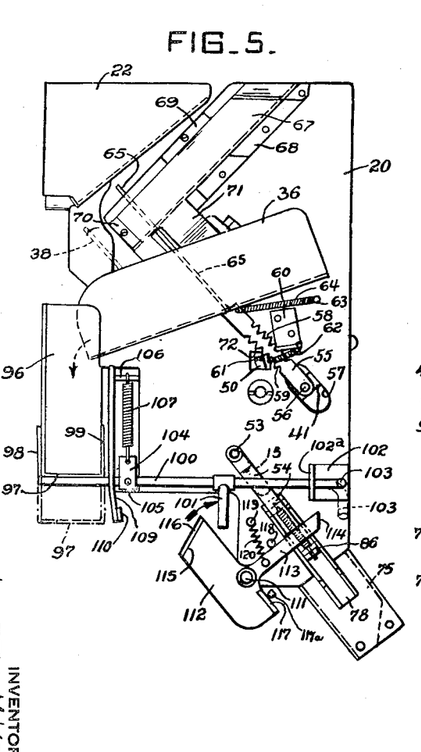
Figure 5 is a rear elevation of the coin mechanism shown in Figures 3 and 4.

Referring first to Figures 3, 4 and 5 which illustrate the coin mechanism, a main plate 20 forms a support for the elements. Secured to the plate 20 is a bracket 21 which supports a chute 22 for receiving rejected coins from the coin tester 23 (Figure 2) and returning them to the delivery bowl 24, as will hereinafter be described.

The coin mechanism illustrated was devised for nickels and dimes but it must be understood that the same principle may be used for other coin values. The nickel slot 18 and the dime slot 19 may be seen in Figure 1.

A chute 25 for dimes is formed of a strip spaced apart from the plate 20 by an angular portion 26 and having a flanged portion 27 secured to the plate 20 by screws 28. The flange and angular portions terminate at 29 and from this point to the lower end, the portion 30, which is a continuation of 25, is parallel to the plate 20 and the space therebetween is open therethrough from top to bottom. At the end the portion 30 is secured to the plate 20 by means of screws 31 passing through a spacer block 32. A stud 33 is carried on the portion 30, and pivotally carried on this stud is a deflector 34. The bottom edge of the deflector is curved rearwardly (as seen in Figure 3) to deflect the dimes through the opening 35 in the plate 20, and into a chute 36 on the opposite side of the plate 20, to be presently described.

An opening 37 is formed in the rearwardly curved bottom edge of said deflector, and a rod 38 extends through this opening and lies within the space between the portion 30 of the chute 25 and the plate 20. The lower end of the rod 38 is secured to a bar 40, the lower end of which is in turn pivotally connected to a lever 41 by a pivot pin 39. The bar 40 has a series of notches 42 formed along one edge thereof, and a series of notches 43 formed along the opposite edge thereof.

A fixed pawl plate 44 mounted on the plate 20, is adapted to be engaged by the notches 42, due to the urge of spring 49 on the bar 40, and a second pawl plate 45 is adapted to be engaged by the notches 43. These pawl plates are so positioned relative to said notches that an escapement effect is obtained.

The pawl plate 45 is carried on a bell crank arm 46 which is supported on the plate 20 by a pivot pin 47. A stud 48 forms a stop defining the normal position of the pawl plate 45 when engaged by the bell crank arm 50, and a spring 62 urges the bell crank against the stud.

A spring 51 has one end secured to a stud 52 on the plate 20, and its other is secured to a stud 53 carried in the upper end of a positionable member 54, thereby urging the positionable member in a direction substantially parallel to the axis of the spring 51. The right end of lever 41, as seen in Figure 3, is pivotally connected to the stud 53 and is also under the urge of the spring 51. The upward movement of the right end of the lever 41, and consequently the upward movement of the positionable member 54 is limited by a slot 15, in the plate 20, into which the lower end of the stud 53 projects.

A bar 55, on the opposite side of the plate 20, seen in dotted lines in Figure 3 and solid lines in Figure 5, is pivoted on the end of a stud 56 mounted in the end of the lever 41 and extending through a clearance slot 57 formed in the plate 20.

The bar 55 has a series of notches 58 formed along one edge thereof, and a second series of notches 59 formed along the opposite edge thereof. A pawl plate 60 mounted on the plate 20 is adapted to be engaged by the notches 58, and a second pawl plate 61 carried on the bell crank arm 50 and, extending through a hole 72 in plate 20, is normally positioned adjacent to the notches 59 by the same stop pin 48 against which the crank arm 50 is urged by the spring 62. A spring 64, having one end secured to the bar 55, and the other end secured to a stud 63 on the plate 20, urges the bar 55 in a direction to place the notches 58 in cooperative relation with the fixed pawl plate 60.

The bar 55 has secured thereto a rod 65, which extends upwardly into a channel 66 formed between the plate 20 and a plate 67, the latter having several bent or offset portions 68, 69, and 70, which are secured to the plate 20. The plate 67 also has an apron portion 71 which deflects coins from the channel 66 into the chute 36.

In Figures 3, 4, and 5, the bars 40 and 55 are shown in positions in which each has been actuated by one coin (in the present embodiment a nickel has actuated the rod 65 of the bar 55, and a dime has actuated the rod 38 of the bar 40).

Figures 6, 7, 8, 9:
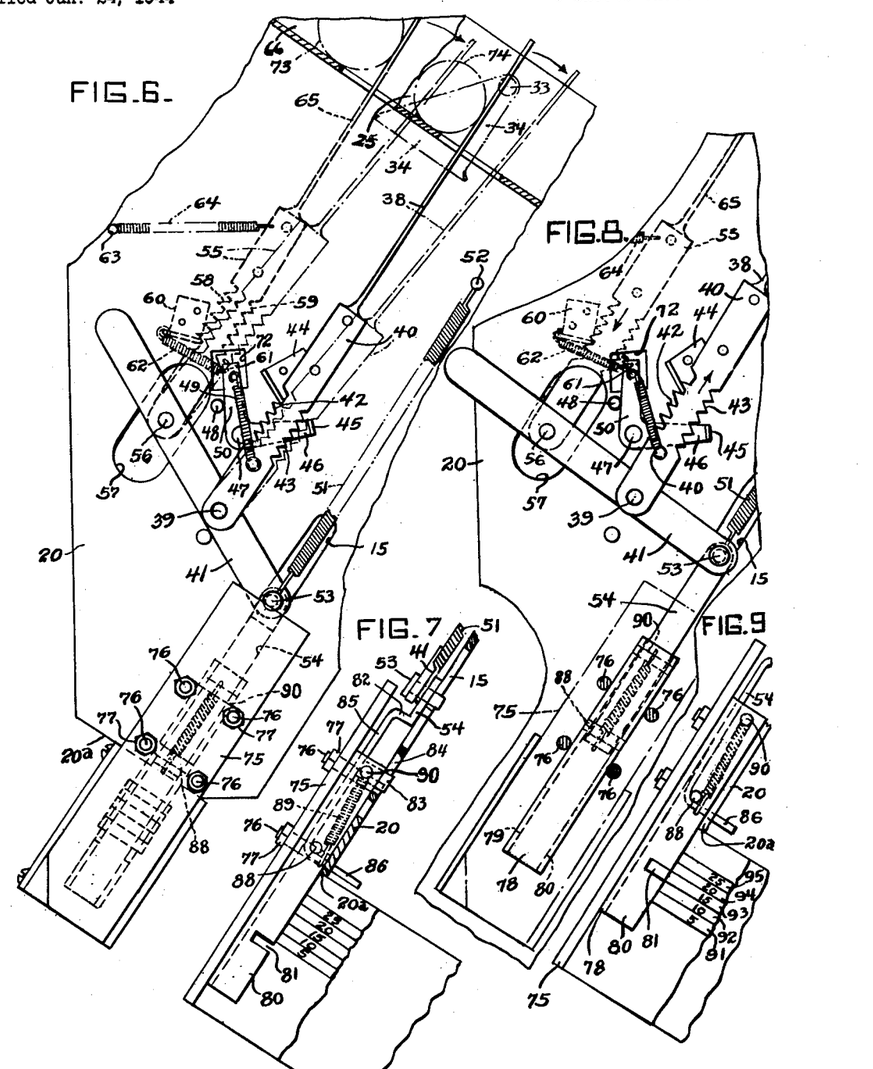
Figure 6 is an enlarged front elevation, partly broken away, of the mechanism showing the actuation of one of the members by a coin of one value and the actuation of another by a coin of a different value.
Figure 7 is a fragmentary view, 90 degree with respect to Figure 6, showing details of the positionable member controlled by the coins and the unlocking member carried thereon and the price bars controlled thereby.
Figure 8 is an elevation similar to Figure 6 after each member has been moved one step by coins, and showing the positionable member after it has moved steps corresponding to the values of the coins entered.
Figure 9 is a fragmentary view similar to Figure 7, after the positionable member has moved the distance shown in Figure 8.

Reference is now made to Figure 6 which is an enlarged view showing the bars 40 and 55 in their normal or reset positions. The spring 51, as pointed out above, urges the right or lower end of the lever 41 upwardly, and since the positionable member 54 is connected to the lever, it is also urged upwardly by spring 51. It will also be noted that the lever 41 has no fixed fulcrum, as is the case with ordinary levers.

Wtih my lever, an entirely novel action is obtained.

The bar 40 is urged upwardly by the spring 49, but is prevented from moving by the engagement of the upper end notch of the group 42 with the pawl plate 44. Since the pivot connection 39 exists between the bar 40 and the lever 41 the pawl plate 44 also prevents the lever 41 from moving upwardly (except under conditions to be presently described).

The bar 55 is urged downwardly by the spring 64, but is prevented from so moving by the engagement of the pawl plate 60 with the lowermost of the notches 58. Since the pivot connection 56 exists between the bar 55 and the end of the lever 41, the pawl plate 60 also prevents the end of the lever from moving downwardly except under the following conditions.

If a nickel 73 is passed down the channel 66, its impact against the rod 65, near its upper end, causes the bar 55 to swing to the right, as viewed in Figure 6, so that the lowest notch 58 is swung away from its pawl 60 and the lowest notch 59 engages its pawl 61. The bar 55 is urged to the left and downwardly by the spring 64. As the bar swings toward the left, the notch 58 next to the lower one engages the pawl 60 and the notch 59 is disengaged from the pawl 61, with the result that the bar 55 is moved down one notch. The bar at the pivot pin 56 is also moved downwardly a like distance. Now since the pivot pin 39 was held against movement during this time by the engagement of the pawl plate 44 with the uppermost notch 42, this pivot pin actually acted as a fulcrum, and since the pivot pin 39 is halfway between the pivot pin 56 and the pivot pin 53, the positionable member, which is connected to the latter moved upwardly a distance equal to the downward movement of the bar 55.

Now if, instead of causing a nickel to pass down the chute 66, a dime 74 were caused to pass down the chute 25 and engage the rod 38 (which is connected to the bar 40), and thereby displace the bar 40, permitting it to move upwardly one notch, the mid-pivotal point 39 of the bar would also move upwardly an equal distance. In this case the pivot pin 56 would be the fulcrum, and the positionable member would move upwardly a distance equal to two notches or steps, and the value set up by the positionable member would be ten cents.

On the other hand, if after causing the nickel 73 to displace the bar 55 as first described, and the positionable member to set up a value of five cents, the dime 74 is then caused to displace the bar 40, as described for the second alternative, an additional ten cents value would be set up by the positionable member, which with the five cent value already set up would make a total of fifteen cents. This latter set of conditions is illustrated in Figure 8. The bar 55 has moved down one notch, and the bar 40 has moved upwardly one notch.

It will be understood that the order in which the coins are placed in the machine makes no difference in the result. For example, if the dime 74 is first sent down the chute 25, the bar 40 would be displaced upwardly one notch, thereby raising the positionable member 54 a space equal to a span of two notches and setting up a value of ten cents. Then if a nickel 73 passing down the chute 66 causes the bar 55 to be displaced downwardly one notch, the positionable member is raised an additional notch causing the total value set up to amount to fifteen cents.

The device herein illustrated and described was devised to control five price bars having values of 5¢, 10¢, 15¢, 20¢, and 25¢. These will presently be described in detail.

When a single nickel is placed in the machine it causes the positionable member 54 to rise a distance equal to one notch and corresponding to the value of 5¢; when two nickels are used the positionable member rises two notches, corresponding to 10¢; when three nickels are used the positionable member rises three notches, corresponding to 15¢; four nickels cause the positionable member to move four notches corresponding to 20¢, and the use of five nickels causes a value of 25¢ to be set up.

It will be apparent then that nickels and/or dimes, singly or in combination representing the amounts of 5¢, 10¢, 15¢, 20¢, or 25¢ may be to actuate my improved coin mechanism.

Referring now to Figures 7, 9, 16, and 17, a plate 75 is held parallel to and spaced apart from the base plate 20 by means of four shouldered studs 76, carrying nuts 77. Slidably mounted between the plates 75 and 20 and guided by the studs 76 is a channeled member 78 of "u" cross section with a portion of the legs 79 and 80 bearing on the plate 20, and a portion overhanging or extending beyond the beveled corner 20a. Formed in the over-hanging portion is a slot 81 cutting both legs. This slot is adapted to receive the end of one out of a plurality of price bars, to be presently described.

The leg 79 has a tongue 83 formed integral therewith, and this tongue is positioned in a slot 84 formed in the plate 20, for defining the two extreme positions of the member 78.

Figures 15, 16, 17, 18, 19:
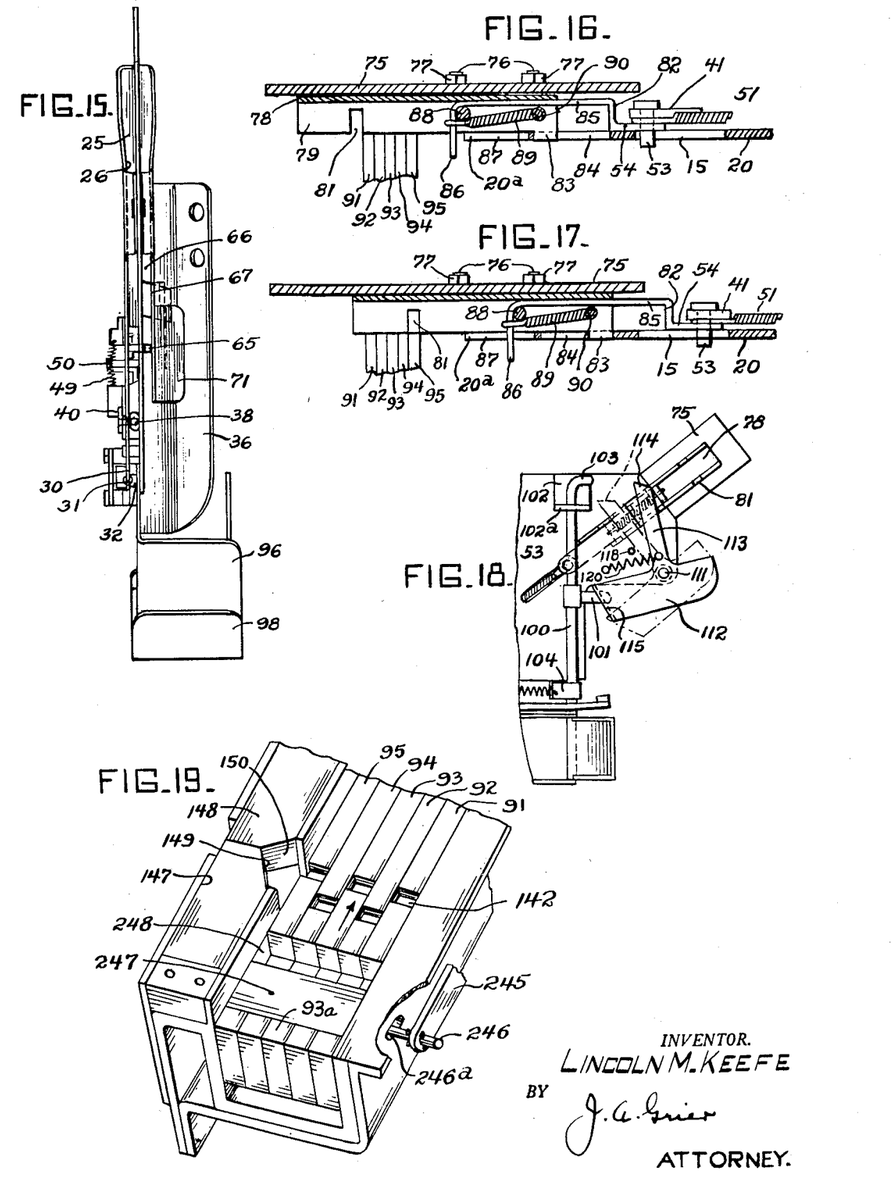
Figure 15 is a view of the coin mechanism as seen along the line of 15—15 of Figure 3.
Figure 16 is a sectional view of the positionable member in its normal or reset position.
Figure 17 is a sectional view of the positionable member after it has moved to its highest value position, and showing the highest value price bar engaging the slot formed therein.
Figure 18 is a view of a portion of the coin mechanism showing a member for restoring the positionable member to its normal position and for releasing the accepted coins.
Figure 19 is a perspective showing means associated with the price bars for initiating a delivery operation.

The positionable member 54, referring more particularly to Figures 16 and 17, has a short upturned portion 82, a horizontal portion 85 which parallels and lies within the channel member 78, and a depending portion 86 which extends through a slot 87 formed in the plate 20. A pin 88 is fixedly mounted in the channel member at a right angle to its longitudinal axis. A spring 89, having one end secured to a pin 90, transverse the channel, and having its other end secured to the depending portion 86 of the positionable member, resiliently urges the pin 88 against the said depending portion 86, and insures the movement of the channel member 78 therewith. If for any reason the channel member 78 becomes "hung up," the spring link 89 permits the positionable member to move without breaking anything.

Now referring to the description above of the movement of the positionable member a distance corresponding to the lengths of three notches when a nickel and a dime was inserted. The channel member 78 moves with the positionable member, and the notch 81 therein (which is shown in the normal or reset position in Figures 7 and 16) is positioned as shown in Figure 9. In endwise relation to the open face of the channel member are price bars 91, 92, 93, 94, and 95 which represent values of 5¢, 10¢, 15¢, 20¢, and 25¢ respectively. These price bars are grouped together, and the bar 91, representing 5¢, is positioned adjacent to the slot 81 when the positionable member is reset. When a value of fifteen cents was set up, as described above, the channel and the positionable member moved to bring the slot 81 in alignment with the price bar 93, representing 15¢, and this price bar may enter the slot 81 under conditions to be presently described.

Other values of coins placed in the machine will effect the positioning of the slot 81 in alignment with others of the price bars representing the value of the coins entered (from 5¢ to 25¢).

Dimes after actuating the rod 38 are deflected into the chute 36 by deflector 34, and nickels, after actuating the rod 65 are deflected into the chute 36 by the deflector 71. Mounted on the plate 20 is a coin receptacle 96, the top and bottom ends of which are open. The upper end of the side of the receptacle, adjacent to the lower end of the chute 36, is also cut away to permit coins to freely enter the receptacle.

A bottom plate 97 has upturned sides 98 and 99 to form a channel, and is secured to a shaft 100. The shaft 100 has a normally depending projection 101 secured thereto. Near the right end (as seen in Figure 5) a bracket 102 is secured to the plate 20 and a hole in the forwardly extending leg 102a thereof is a hole in which the shaft 100 is journaled. The right end 103 of the shaft 100 is bent to form a handle the use of which will hereinafter be described.

Adjacent to the coin receptacle 96 is a block 104 which is secured to shaft 100 by means of a pin 105. A bracket arm 106 is secured to the receptacle 96, and a spring 107 has one end connected to the arm 106 and the other end is connected to the block 104, thereby urging the shaft upwardly into the apex of a V slot 108 formed in the plate 109 depending from the receptacle 96. A strip 110 has each end thereof secured to the plate 109, thereby spanning the open or widest end of the V slot 108.

If the handle 103 is turned to the position shown in dot-dash lines the corner 97a of the bottom plate is swung downwardly (the corner 97b acting as a fulcrum) and the coins in the receptacle 96 are discharged into a chute leading to a main receptacle (not shown) usually placed in the bottom compartment of the cabinet. This occurs as the merchandise is being delivered, as will be presently described.

As soon as the handle 103 is released the spring 107 returns the bottom plate to its normal position. This handle may also be used for testing. A stud 111, mounted on the plate 20, has journaled thereon, a bell-crank 112, the arm 113 of which has an end 114 adapted to cam against the depending portion 86 of the positionable member 54. The body 112 of the bell-crank has a bent portion 115 having an angular end surface 116 which is adapted to cam against the shaft projection 101, and a second bent portion 117 which forms an ear adapted to be actuated by the delivery mechanism of the vending machine as the merchandise is being ejected.

A stop pin 118 defines the normal position of the bell-crank as a spring 120 having one end secured to the stud 119 and its other end secured to the arm 113 urges the latter against the stop pin. When the ear 117 is pushed in a clockwise direction (Figure 5) the surface 116 cams against the shaft extension 101, causing the bottom plate 97 to tilt and discharge the coins from the receptacle 96. At the same time, the arm 113 is swung to bring its cam surface 114 in contact with the portion 86 of the positionable member 54, and as the bell-crank moves its full stroke it carries the positionable member back to its normal position. The channel member is at that time positioned with its slot 81 clearing the price bars (the position shown in Figure 16). The bars 40 and 55 are reset to their normal positions also, due to the fact that they are linked to the lever 41 which is connected to the positionable member by the pin 53. The reset position of these bars is shown in Figure 6.

Figure 1:
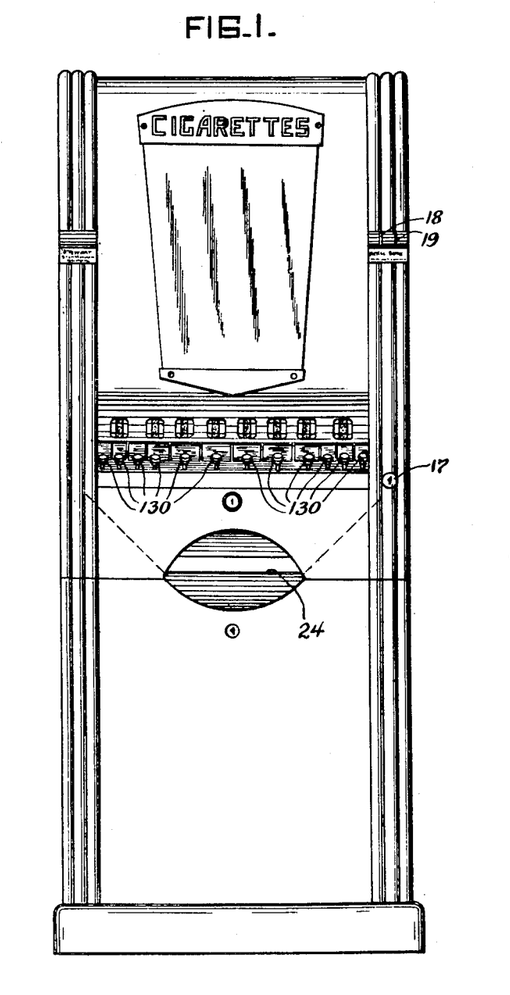
Figure 1 is a front elevation of a cigarette vending machine in which is embodied one of the new and improved coin mechanisms.
Figure 10:
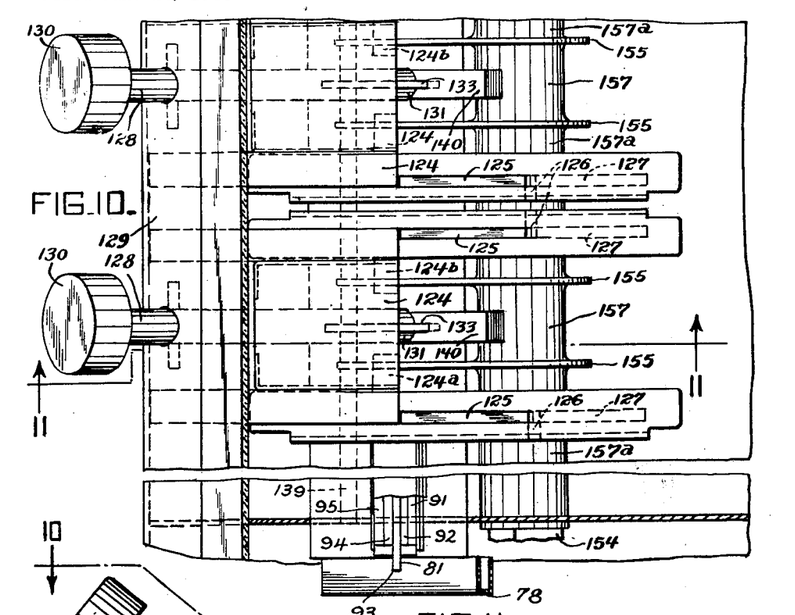
Figure 10 is a plan view showing a plurality of delivery stations as seen on the lines 10—10 of Figure 11.
Figures 11, 12, 13, 14:
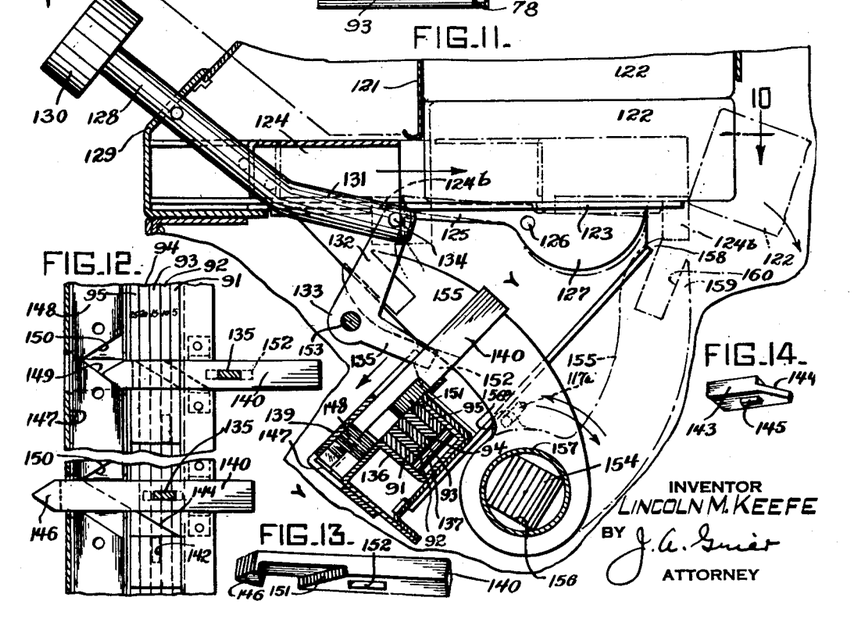
Figure 11 is a sectional elevation of a merchandise column, a delivery mechanism associated therewith, and the relation thereto of my new price bars controlled by the coin mechanism herein shown and described.
Figure 12 is a view showing more details of the price bars.
Figure 13 is a perspective view of one of the price bar actuator key members.
Figure 14 is a perspective view of one of the price bar cam keys, used for associating any desired merchandise column with a given price bar.

The vending machine has a plurality of merchandise columns each controlled by a push rod as may be seen in Figures 1 and 2. Details of the push rods and the mechanism controlled thereby are shown in Figures 10 and 11, Figure 11 showing an elevation taken down the center of one column and Figure 10 showing a plan view of the mechanism with the merchandise columns removed. The column shown in Figure 11 and designated by the numeral 121 contains packages of cigarettes one of which is shown at 122 which rests on a bottom plate 123. The package is discharged by means of a pusher 124 which is suitably guided and which slides along on the plate 123.

A lever 125 mounted on a pivot pin 126 has an enlarged end 127 which acts as a weight and causes the lever to rise through a slot (not shown) in the plate 123 and the end of this lever engages the pusher member 124 to prevent it from being operated when the column is empty. Two such levers are employed in each column.

A push rod 128 extending through a suitable hole formed in the front plate 129 carries a knob 130 on the outer end thereof, and the inner end has a portion 131 which is angular with respect to the main rod 128. The end of the portion 131 is yoked and straddles the arm 132 of a bell crank 133, a pivot pin 134 passing through both the yoke and the end of the arm 132 serving to pivotally connect these two portions together. The other arm 135 of the bell-crank 133 will presently be described.

The price bars 91, 92, 93, 94 and 95 representing respectively 5¢, 10¢, 15¢, 20¢, and 25¢, and their relation to the channel member 78 have already been described above. These price bars are positioned within a channel 136 with friction reducing members 137 there-below. This channel and the price bars contained therein extends across the delivery mechanism of every column in the machine, thereby making it possible to associate any price bar with any column or any number of columns. Then by removing the cover plate 139 and removing the actuator keys, one of which is shown at 140, the operator may associate any column desired with any one of the price bars as follows:

Each price bar has a notch or slot, such as the slot 142, formed therein, in line with the front of each merchandise column. All of the slots are not shown in the drawings but it would be pointed out that the slots in the several price bars are staggered with respect to each other.

For associating any column with any price bar a plurality of actuator cams are provided. One of these cams is shown in Figure 14 and is designated by the numeral 143. These cams are generally rectangular in form and have angular cam surfaces 144 with which the actuator keys cooperate in a manner to be presently described. Projecting below the main body of the cam 143 is a rectangular boss 145 which is adapted to fit in one of the slots in a price bar. The particular cam shown in Figure 14 has its rectangular boss 145 positioned to engage a slot 142 in the middle price bar 93 which represents a value of 15¢. Other such cams have their bosses positioned to engage others of the price bars, therefore in order to associate any given column with any given price bar it is only necessary to engage the proper cam 143 with the desired price bar in front of said column.

Alongside the channel 136 carrying the price bars is a channel 147 which carries a plurality of slidable members 148 having beveled ends 149 and 150. The total length of all of the members 148 is equal to the length of the channel minus the thickness of one actuator key 140 so that if one actuator key is interposed between the adjacent ends of two such members no other actuator key can interpose itself between any of the others. In other words when any one actuator key is operating, all of the other actuator keys are "locked out."

The actuator key 140 which is shown in perspective in Figure 13 has a V shaped point 146 the edges of which are parallel to and cooperate with the beveled surfaces 149 and 150 on the lockout members 148.

These keys are slotted underneath to form an angular surface 151 which is adapted to cooperate with the cam surfaces 144 of the cam keys 143. A vertical slot 152 is formed in the actuator key 140 to accommodate the end of the arm 135 of the bell crank 133. It will be seen in Figure 11 that the slot 152 tapers, its smaller end being toward the point where the end of the arm 135 of the bell crank enters the slot. The bell-crank is journaled on a shaft 153.

When the knob 130 is depressed the bell-crank is rotated in a clockwise direction thereby bringing the actuator key 140 linked thereto forward, or to the left as seen in Figure 12. First the point 146 cams against the surfaces 149 and 150 of the lockout members 148 and permits the body of the actuator key to interpose itself between the adjacent ends of two of said members, thereby locking out all the other keys. As the actuator key continues to advance, the cam surface 144 is engaged by the angular surface 151 and thereby the cam member 143 and the price bar 93 associated therewith (Figure 12) is moved downwardly, provided the channel member 78 has been moved to the position shown in Figure 9 by the deposit of coins totaling a value of 15¢ into the coin mechanism. If the proper number of coins had not been inserted, the notch 81 would not be in the proper position to receive the end of the price bar 93, therefore the movement of the bell-crank can only be effected up to the point where the surface 151 engages the surface 144 on the cam member 143.

The same would be the case if more than the value of 15¢ in coins had been entered so that the only recourse left to the purchaser would be to press the coin return button and get his money back. On the other hand, if he is determined to purchase something, he may select a knob associated with a 20¢ merchandise column if the excess entered into the machine were 5¢, or a 25¢ column if 10¢ in excess has been entered.

A square shaft 154 (Figures 11 and 21) extends across all of the columns 121 in the machine and is suitably journaled in bearings (not shown) therein. A plurality of engaging arms 155 is mounted on the shaft 154, suitable square holes 156 being formed therein, and are spaced apart on said shaft and consequently in said columns by spacer sleeves 157. The engaging arms 155 and their spacer sleeves 157 are centralized beneath each column. The ends of the engaging arms are bifurcated to form fingers 158 and 159 separated by a slot 160. The arms 155 are in alignment with and the fingers thereon are adapted to engage depending ears 124a and 124b, of any one of the pushers 124 which is advanced by depressing one of the knobs 130. As a desired knob 130 is depressed, its pusher member 124, is advanced to a position where its depending ears are engaged when the engaging arms are moved. Between each group consisting of an engaging arm 155, spacer sleeve 157 and another engaging arm 155, are other spacer sleeves 157a which are longer than the spacer sleeves 157. The entire line of engaging arms and spacer sleeves are clamped or otherwise rigidly secured together so that the shaft 154 and all said parts form, in effect, a unitary structure, bodily movable as a unit. Since the pushing down of one knob locks out all the others, only one pusher 124 can be advanced to have its depending ears engaged by the associated engaging arms, delivery can only be effected from one column—the column in alignment with the knob 130 selected.

Figure 20:
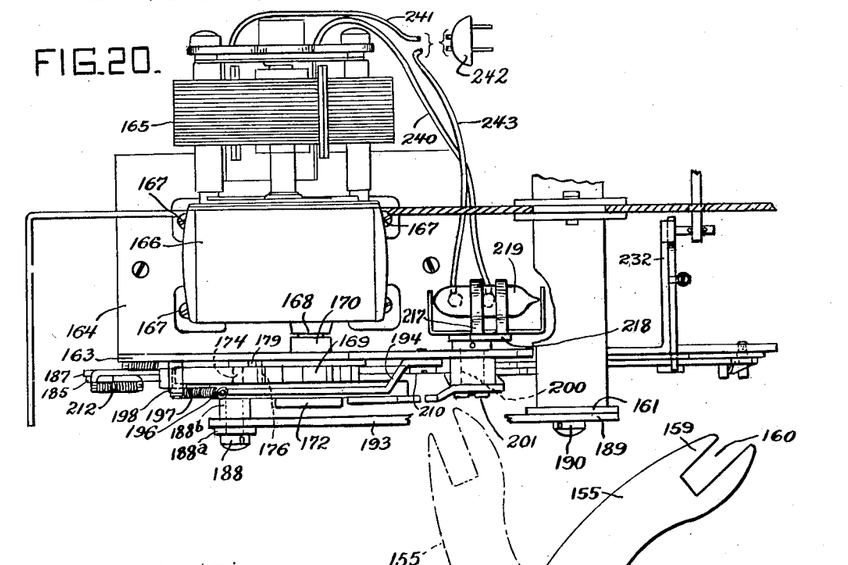
Figure 20 is a plan view of the electric drive for ejecting merchandise.
Figure 21:
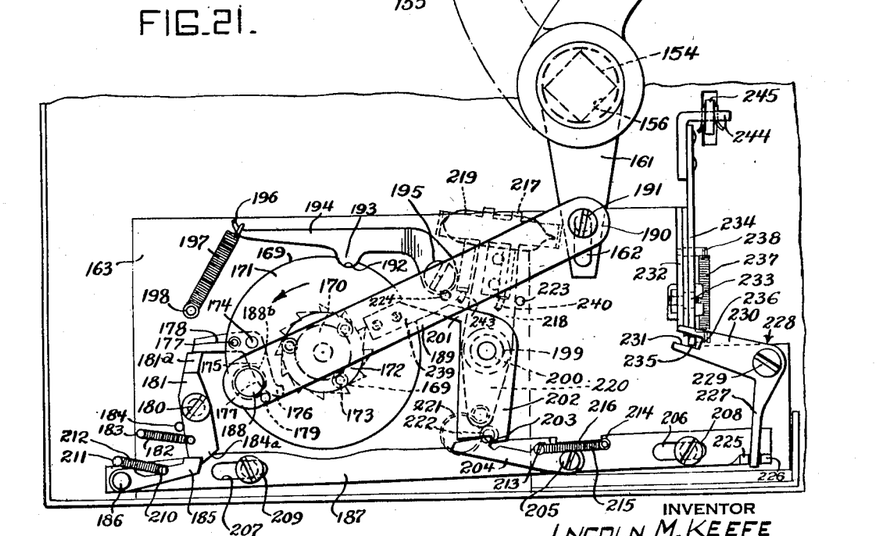
Figure 21 is an elevation of the mechanism shown in Figure 20.

Mounted on the shaft 154 is a reset arm 156a which has pivotally connected thereto a pusher member 117a for actuating the bell-crank 112. Also mounted on the end of the shaft 154 is a crank-lever 161 which has a square hole formed therein at one end to fit the shaft. The other end has an elongated hole 162 formed therein. This crank arm depends vertically, as may be seen in Figures 20 and 21, when the engaging arms are in their normal position. It will be understood that Figure 21 is a view of the left end of the shaft, whereas Figure 11 is a view looking in the opposite direction.

Returning to Figures 20 and 21, a plate 163 has formed integral therewith a horizontal portion 164 forming a support for an electric motor 165 and a directly connected gear reduction unit 166, the latter being secured to the support 164 by screws 167. A low speed shaft 168 projecting from the unit 166, projects through a hole or bearing in the plate 163.

A ratchet wheel 169 having a hub 170, extending through and journaled in said last mentioned hole, is keyed to the shaft 168. The hub 170 has a forwardly extending boss upon which a disc 171 is journaled. A washer 172 is secured to the end of the hub 170 by means of screws 173.

The disc 171 has a rearwardly extending stud shaft 174 on which a ratchet arm 175 is journaled. The lower end of the ratchet arm carries a pawl tooth 176 adapted to engage the teeth of the ratchet wheel 169, and is urged toward the ratchet by a spring 177, one end of which is connected to an arm 178 formed integral with the ratchet arm 175 and the other end of which is connected to a stop pin 179 mounted on the disc.

The plate 163 carries a shouldered screw 180 upon which a lever member 181 is journaled. A spring 182 has one end connected to the lever member and the other end is connected to a pin 183 mounted in the plate 163. This spring urges the lower portion of the lever against a stop pin 184, and the upper end 181a to a position where it engages the arm 178, thereby effecting the holding of the pawl 176 away from the teeth of the ratchet wheel 169, and in engagement with a stop 179 on the disc 171. The lower end of the lever 181 is provided with a notch 184a, and is adapted to be actuated by a pawl 185 mounted on a stud 186 on a bar 187, which will presently be described.

The disc 171 carries a shouldered screw 188, upon which one end of a connecting rod 189 is journaled between a washer 188a and a sleeve 188b. The other end of the connecting rod 189 has fixed thereto a stud shaft 190 with a portion 191 of reduced diameter engaging the slot 162 in the crank 161.

An arcuate notch 192 is formed in the disc 171, and this notch is engaged by a matching tongue 193 formed on a lever 194 one end of which is journaled on a shouldered screw 195 secured to the plate 163. The other end is reduced in cross section and upturned at 196 to be engaged by one end of a spring 197. The other end of this spring is secured to a post 198 on the plate 163, thus urging the lobe 193 into contact with the periphery of the disc 171.

A boss 199 mounted in the plate 163 forms a bearing for a shaft 200 which is secured to a dog 201 which is formed integral with a depending arm 202. A notch 203 is formed on the lower end of arm 202, and this notch is adapted to be engaged by a pawl 204 mounted on a shouldered screw 205 on the bar 187.

The bar 187 has slots 206 and 207 formed therein and these slots are spaced apart from each other. The slot 206 extends axially and the slot 207 has its axis inclined to the horizontal so that, as the bar is moved to the right (Figure 21) the left end rises as it moves and causes the pawl 185 thereon to rise as it actuates the lever 181. Extending through the slot 206 is a shouldered screw 208 secured to the plate 163, and likewise a similar shouldered screw 209 passes through the slot 207 and engages the plate 163, permitting the bar to be moved endwise as aforesaid.

The pawl 185 previously described has an upturned tongue 210 formed integral therewith and a similar tongue 211 is formed on the bar 187. A spring 212 engaging these tongues urges the pawl 185 toward the end of the lever 181 and its notch 184.

The pawl 204 has an upturned tongue 213 and the bar 187 carries a similar tongue 214. These tongues are engaged by a spring 215 which urges the pawl 204 into engagement with the end of the depending arm 202 and its notch 203.

The upper end 218 of a lever, secured to the shaft 200, carries a clip 217 for supporting a mercury tube switch 219, and the lower end 220 of this lever has secured thereto one end of a toggle spring 221. The other end of the toggle spring is connected to a stud 222 mounted in the plate 163. Stop pins 223 and 224 limit the two toggling positions of the lever 218, 220, the normal or off position of the mercury switch being when the lever is against the pin 223 (the position shown in Figure 21).

The bar 187, at the right end thereof, has spaced lateral tongues 225 and 226 between which an arm 227 of a bell-crank 228 extends. The bell-crank is pivotally mounted on the plate 163 by means of a shouldered screw 229. The other arm 230 is made bifurcated by forming a notch 231 therein.

Mounted on a rearwardly extending portion 232 of the plate 163 is a shouldered screw 233 in a bell-crank 234, a horizontal arm 235 of which extends into the slot 231 in the bell-crank 228. A stud 236 mounted on arm 235 has one end of a spring 237 fastened to it, and the other end of this spring is connected to a second stud 238 mounted in the plate 232 and thus the arm 235 and the arm 230 of the bell-crank 228 are urged upwardly. This results in normally maintaining the bar 187 in its normal position (the position shown in Figure 21).

The disc 171 also has a camming member 239 secured thereto to engage the dog 201, in a manner to be described, for returning the mercury switch to its normal or "off" position.

A wire 240 connects one terminal of the motor 165 to the mercury switch 219, the other terminal of the motor is connected by a wire 241 to one prong of a connector plug 242, and the other prong of the plug is connected via a wire 243 to the mercury switch—thus forming an electrical circuit adapted to be completed by the mercury switch.

The vertical arm 234 of the bell-crank has an extension 244 secured thereto and this extension is connected by a rod 245 (Fig. 19) to a stud shaft 246 carried by a slide-block 247 positioned within a channel 248 formed by milling a slot through all of the price bars 91, 92, 93, 94, and 95. This channel is formed in the price bars near the opposite ends from those ends first described as associated with the positionable member 79, 80. The movement of any one of the price bars causes the slide-block 247 to move, and the rod 245 is moved.

*Operation*

The purchaser places coins representing the price of the article wanted in the machine, placing nickels in the slot 18 and dimes in the slot 19. For example if the price is 15¢ and he has a nickel and a dime, the nickel is placed in slot 18 and the dime in slot 19. These coins pass through the coin tester (which is not a part of the present invention) and then they traverse my coin mechanism and cause the positionable member and the member 78 associated therewith to move to a position where the slot 81 is in alignment with the price bar 93, which is the 15¢ price bar. This price bar may be associated with several columns carrying 15¢ articles, so the purchaser may select the brand of articles he desires by depressing the push button 130 in front of the column containing the wanted brand. The action effected has been fully explained above in connection with Figure 2. The bell-crank 133 urges the actuator key between the angular faces 149 and 150 of the lockout members 148 and the cam surface 151 on said key engages the cam surface 144 on the actuator cam 143, associated with the 15¢ price bar 93, urging the price bar toward the positionable member 80. Since the slot 81 (Figure 9) is in alignment with the price bar 93 the end of said bar can enter the slot 81, and none of the other price bars can move because they have solid portions of the member 79, 80 against their ends.

While the movements just described are occurring, the pusher member 124 is advanced slightly to the position shown in dot-dash lines.

The movement of the price bar 93 in the direction of the arrow causes the portion 93a of the price bar to move the block 247 (Figure 19). The stud shaft 246, extending from the block through the slot 246a, is moved therewith and the rod 245 is moved thereby.

The rod 245 pushes the extension 244 and its arm 234 and causes the arm 235 to swing the arm 236 of the bell-crank 228 (Fig. 21), and the other arm 227 moves the bar 187 to the right, causing two things to happen:

The pawl 204 engaging the notch 203 swings the mercury switch to its "on" position, supplying current to the motor. At the same time the pawl 185, engaging the notch 184 swings the lever 181 counter-clockwise, thereby releasing the arm 178 and allowing the pawl 176 to engage the teeth of the ratchet wheel 169. Since by this time the motor is running, the ratchet wheel, through the medium of the pawl 176 drives the disc 171 (slowly due to the reducing gear box 166) in a counter-clockwise direction, as seen in Figure 21, causing the connecting rod 189 to swing the crank arm 161 in a counter-clockwise direction and thereby rocking the shaft 154 in the same direction until the disc 171 has completed a half revolution. During its next half revolution, the shaft is rocked back to its initial position.

During the time the shaft 154 starts moving in its counter-clockwise direction, the bifurcated ends of the engaging arms 155 engage the depending ears 124a and 124b of the pusher member 124 in the column selected and drive the pusher member to the left as seen in Figure 21, which is to the right as seen in Figure 11, thereby ejecting a package of cigarettes 122 shown in dot-dash lines. While this in occurring, the reset arm 156a, through the medium of the pusher member 117a, actuates (Figures 3, 4, 5 and 11) the bell-crank 112, accepting the coins and resetting the coin mechanism.

When the shaft 154 is moved in a clockwise direction (during the second half-revolution of disc 171) the pusher member 124 is returned to its normal position, a spring (not shown) being provided to facilitate this action.

As the disc 171 completes its second half-revolution two things occur. First, the cam member 239 on the disc engages and actuates the dog 201 and causes the mercury switch to toggle over to its "off" position, thereby interrupting or shutting off the current supplied to the motor. Secondly, the pawl arm 178 is engaged by the end 181a of the lever 181, thereby disengaging the pawl tooth 176 from the ratchet wheel 169, and as this occurs the disc is indexed by the engagement of the tongue 193 with the notch 192.

Thus it will be seen that the operation is completed. The customer gets the merchandise and the machine is all set for the next operation.

When the positionable member is set—by the insertion of coins—the machine cannot operate if the purchaser tries to select a higher priced article, or a lower priced article. He can only get an article the price of which is equal to the money inserted. The money is held in the coin receptacle 96 until a transaction is completed. If he wants an article lower in price than the money put in, he cannot get it—so he pushes the coin return button, causing the handle end 103 of the shaft 100 to be actuated, thereby tipping the bottom plate 98 of the coin receptacle in a direction to return the coins to the customer.

It will be observed that all of the elements of my new and improved coin mechanism are made of stampings and/or punchings, instead of die castings which have heretofore been widely used in this art. This results in rapidity of production, the use of a minimum of material and consequently light weight.

The apparatus herein shown and described is illustrative of the invention and it will be understood that I am not to be limited to the details of said apparatus; instead the limitations lie within the scope of the following claims.

I claim:

1. In a coin device, a chute through which coins may pass, a lever having one end extending into the path of said coins, whereby the impact of the coins thereon causes the lever to move, escapement means associated with said lever for gauging the movement thereof, a second chute for coins of a different value from that of said first coins, a second lever having one end extending into the path of said second coins, whereby the impact of said second coins thereon causes the second lever to move, escapement means associated with said second lever and a positionable member interconnected with both said levers and adapted to be moved one increment by said first lever and two increments by said second lever.

2. In a coin device, a positionable member and a guideway therefor, said positionable member being adapted to be moved therealong in increments, a lever connected to said member and actuated by the impact of a coin of one value thereon for causing said member to move one increment, and a second lever also connected to said member and actuated by the impact of a coin of greater value than said first coin for causing said member to move a distance greater than one increment.

3. In a coin device, a positionable member and a guideway therefor, said positionable member being adapted to be move therealong in increments, a lever connected to said member and actuated by the impact of a coin of one value thereon for causing said member to move one increment, and a second lever connected to said member and actuated by the impact of a coin double the value of said first coin thereon for causing said positionable member to move two increments.

4. In a coin device, a first member adapted to be actuated by coins of one value, a second member adapted to be actuated by coins whose value is a multiple of said first coins, a common floating support pivotally connected to said members in space relation to each other, the spacing being of a ratio comparable to the values of the coins controlling said members, a positionable member connected to said support whereby the pivotal connection with said second member forms a fulcrum for said support when said first member is being actuated, and the pivotal connection with said first member forms a fulcrum for said support when said second member is being actuated.

5. In a coin mechanism, a first member to be actuated by coins of one value, a second member to be actuated by coins of a different value, a positionable member to be moved in accordance with the total value of a series of coins actuating either one or both of said members and a lever pivotally connected to all three of said members, the pivotal connection to said first member acting as a pivot about which the action of said second member causes said lever to move in one direction, and the pivotal connection to said second member acting as a pivot about which the actuation of the first member causes said lever to move in the opposite direction, said positionable member moving in one direction regardless of whether one or both of said members is actuated.

6. In a coin mechanism, a chute for coins of one value, a second chute for coins of a greater value, a positionable member movable along a definite path in steps, spring means tending to urge said member along said path, an actuatable member associated with said first chute, a second actuatable member associated with said second chute, a bar pivotally connected to all said members, the points of connection being spaced apart from each other, escapement means associated with said first actuatable member, a second escapement means associated with said second actuatable member, both said escapements means normally holding all said members against movement by said spring means, said actuatable members being adapted each time one of them is actuated by a coin to move a distance determined by its escapement thereby permitting said positionable member to move a step or steps proportionate to the value of the coin.

7. In a coin device a positionable member adapted to move along a fixed path in steps with respect to a reference point, spring means connected to said member and adapted to be fully tensioned when said member is reset, an actuatable member linked to said positionable member, said actuatable member including an escapement holding said positionable member against the urge of said spring means, means for causing a coin of one value to move said actuatable member one escapement stroke, thereby permitting said positionable member to move under the urge of said spring means a predetermined distance with respect to said reference point.

8. The invention according to claim 7, in which said positionable member has a slot formed therein, and in which a plurality of bars, termed price bars, are grouped adjacent to said positionable member with their ends terminating in a path traversed by the movement of said slot as said positionable member is moved along, each of said bars representing a different value so that a bar of a given value may enter said slot when the same value of money is inserted in said coin device, a plurality of merchandise columns spanned by said price bars and means adapted to be engaged with said price bars for associating one or more of said columns with any desired price bar.

9. In a multi-column vending machine, a group of price or value bars under control of a coin device and spanning all said columns, said price bars each having a notch formed therein in line with each of said columns, said notches being staggered with respect to each other in the several bars, separate cam means each carrying a depending boss, said cam means each being adapted to be positioned on said price bars with its depending boss engaging a selected notch in a given price bar in accordance with the value of the merchandise in a given column, and means adapted to be actuated by an operator for engaging one of said cams and moving the price bar with which it is associated longitudinally and also engaging means to effect the ejection of an article of merchandise from a wanted column.

10. A vending machine according to claim 9 in which said means adapted to be actuated by an operator includes, a lever for each column, and in which each lever has associated therewith means carrying a camming surface adapted to cooperate with the cam means carried on a price bar for its column, and also includes means for controlling the actuation of the ejector means for its column.

11. In a coin mechanism, a support, a coin chute on said support, a positionable member adapted to be moved along a fixed path on said support in steps, spring means urging said member along said path, escapement means comprised of a lever carrying ratchet means, fixed pawls on said support in cooperative relation therewith, the end of said lever extending from said escapement means into said chute, an arm pivotally connected to said lever and pivotally connected to said member, a fulcrum connecting said arm to said support, said lever being adapted when actuated by the impact of a coin passing therethrough to actuate said escapement means and allow said member to advance along said path one step defined by said escapement means.

12. In a coin controlled mechanism, a support, a lock, a coin chute on said support, an oscillatable lever operatively connected to said lock escapement means comprised of an element carried on and movable with said lever, and cooperative means fixed on said support, said lever extending into said chute in the path of coins and adapted to be actuated by a coin in motion therethrough for moving an element of said lock.

13. In a coin controlled mechanism, a lock and release means therefor, said release means including an oscillatable lever having one end thereof extending into a coin chute and adapted to be actuated by the impact of a coin in motion therethrough, said lever having ratchet means movable therewith and stationary pawl means cooperating therewith to form an escapement.

14. In a coin device, movable means adapted to set up a representation of the value of one or more coins, said device including a coin chute, a lever extending into said chute and adapted to be moved by the impact of a coin in motion in said chute, said lever being operatively connected to said movable means, escapement means formed in part of means on and movable with said lever and in part of stationary means cooperating therewith, said escapement means being adapted to govern and define steps of movement of said movable means, each step representing the unit value of said coins.

15. In a device of the character described, escapement means including lever means adapted to be moved by impact with the coins moving under the influence of gravity, an inclined chute down which said coins may roll, said lever carrying ratchet means and having its end extending into said chute and in the path of said coins, fixed pawl means cooperating with the ratchet means of said lever, and a member linked to said lever means and moved thereby in steps in respect to a reference point.

16. In a coin controlled mechanism, a support, a lever on said support, escapement means formed in part on said lever and in part of stationary means on said support, means to cause a coin to move said lever by impact therewith, and a positionable member carried in a guideway on said support and operatively connected to said lever, said member being adapted to move a predetermined distance defined by said escapement means for each movement of said lever by said impact.

17. In a coin device, a support, an inclined chute thereon through which coins may pass, a lever having one end extending into said chute and in the path of said coins, whereby the impact of the coins with the lever causes the lever to move, escapement means comprised in part of means on said lever and in part of stationary means on said support for gauging the movement of said lever, and a positionable member guided along a path on said support, said member being operatively connected to said lever and moved thereby in increments defined by said escapement means.

18. In a coin mechanism, a support, a plurality of levers each adapted to be actuated by a coin of different value, whereby said mechanism may be operated by coins of a plurality of values, singly, plurally, or combinationally, said levers being moved by the impact of the coins thereon down individual chutes for each lever, a straight guideway on said support, a positionable member in said guideway and conjointly controlled by said mechanism, escapement means for each lever, each being comprised in part of a member movable with its lever, and stationary cooperating means on said support, said escapement means being adapted to gauge the movement of said positionable member and thereby to set up credits in accordance with the coin or coins inserted in said mechanism.

19. In a coin mechanism, a support, a first lever adapted to be actuated by the impact of a coin of one value, a second lever spaced apart from said first lever and adapted to be actuated by the impact of a coin of a different value, a positionable member carried in a guide on said support, an arm pivotally connected to said positionable member and to both said levers, the connection to the second of said levers being midway between the connections to the first lever and the connection to said pivotal member, individual escapement means for said levers for gauging the movements thereof, whereby a coin acting upon the first mentioned lever causes said positionable member to be moved one increment, while a coin moving said second lever will cause said positionable member to move two increments, the pivotal connection of either of said levers forming a fulcrum when the other is actuated.

20. In a coin controlled mechanism, a support, a positionable member adapted to be moved along a path on said support to a plurality of positions representing different values, escapement means for controlling said member, said escapement means being comprised of one lever adapted to be actuated by coins of one value and including cooperative means on said lever and movable therewith and stationary cooperative means on said support, and a second lever adapted to be actuated by coins of a different value and including means thereon and movable therewith and stationary cooperative means on said support, said levers being in the paths of said coins and adapted to be actuated solely by impacts of the coins thereagainst, whereby said member is moved along said support to positions representing the sum of the values of the coins which actuated said levers.

21. In a coin device, a support, a positionable member guidedly carried on said support and adapted to be moved in steps to any one of several positions representing different prices, a pair of levers operatively connected to an arm pivotally connected to said member, coin chutes for two different values of coins and each including a passage into which one of said levers extends, whereby a coin passing through either chute actuates the lever extending therein by impact thereagainst, and escapement means for each of said levers, each escapement means being comprised of an element on and movable with its lever and another element stationarily carried on said support.

22. In a multi-column vending machine including article ejecting means, a coin device, and a push button for each column of articles; electrical control means comprised of a unitary structure mounted in one side of and bodily removable from said machine, said structure including a horizontal base plate and a vertical plate secured thereto, an electric motor supported on said base plate, a normally open toggle switch journaled on said vertical plate, a circuit connection between said motor and said switch, a connector cord having one conductor connected to said motor and another conductor connected to said switch, both said conductors terminating in a connector plug adapted to lead to a source of current, a one revolution clutch journaled in said vertical plate, reduction gearing between said motor and said clutch, means moved by said clutch and detachably connected to said ejecting means, mechanical trip means on said vertical plate conjointly cooperating with said switch and said clutch for closing the switch and initiating an operation of said clutch, and mechanism carried on said vertical plate in cooperative relation to said trip means and controlled by said coin device and one of said push buttons.

23. In a vending machine including a plurality of columns for articles of merchandise, a push button for each of said columns, article ejecting means, and a coin device; electrical control means comprised of a unitary structure mounted in one side of and bodily removable from said machine, said structure including a horizontal base plate and a vertical plate secured thereto, an electric motor supported on said base plate, a normally open toggle switch journaled on said vertical plate, a circuit connection between said motor and said switch, a connector cord having one conductor connected to said motor and another conductor connected to said switch, both said conductors terminating in a connector plug adapted to lead to a source of current, a one revolution clutch journaled in said vertical plate, reduction gearing between said motor and said clutch, means moved by said clutch and detachably connected to said ejecting means, mechanical trip means on said vertical plate conjointly cooperating with said switch and said clutch for closing the switch and initiating an operation of said clutch, bell-crank means pivotally carried on said vertical plate and having a depending arm operatively connected to said mechanical trip means and having a generally horizontal arm adapted to be actuated by means external to said structure, and mechanism conjointly controlled by said coin mechanism and any single one of said push buttons, said mechanism including means operatively connected to said generally horizontal arm, whereby said bell-crank when actuated by said means in turn actuates said trip means.

24. In a vending machine including a plurality of columns for articles of merchandise of several values, a push button for selecting the column from which an article is to be ejected, article ejecting means, a coin device adapted to set up values in accordance with the coins delivered thereto, a plurality of price bars cooperating with said coin device and each adapted to release the article ejecting means on those of said columns containing articles of like values, electrical control means comprised of a unitary structure mounted in one side of and bodily removable from said machine, said structure including a horizontal base plate and a vertical plate secured thereto, an electric motor supported on said base plate, a normally open toggle switch journaled on said vertical plate, a circuit connection between said motor and said switch, a connector cord having one conductor connected to said motor and another conductor connected to said switch, both said conductors terminating in a connector plug adapted to lead to a source of current, a one revolution clutch journaled in said vertical plate, reduction gearing between said motor and said clutch, means moved by said clutch and detachably connected to said ejecting means, mechanical trip means on said vertical plate conjointly cooperating with said switch and said clutch for closing the switch and initiating an operation of said clutch, and linkages between said trip means and said price bars for actuating said trip means.

LINCOLN M. KEEFE.

REFERENCES CITED

The following references are of record in the file of this patent:

UNITED STATES PATENTS

| Number | Name | Date |
|---|---|---|
| 7,074 | Parmelee | Feb. 5, 1850 |
| 393,719 | O'Kelly | Nov. 27, 1888 |
| 752,036 | Compton | Feb. 16, 1904 |
| 1,282,436 | Lewis et al. | Oct. 22, 1918 |
| 1,350,742 | Sholl | Aug. 24, 1920 |
| 1,562,178 | McCormick | Nov. 17, 1925 |
| 1,652,919 | Walker | Dec. 13, 1927 |
| 2,156,531 | Geer | May 2, 1939 |
| 2,217,845 | Mueller | Oct. 15, 1940 |
| 2,323,981 | Du Grenier | July 13, 1943 |
| 2,377,413 | Fry | June 5, 1945 |

FOREIGN PATENTS

| Number | Country | Date |
|---|---|---|
| 354,418 | Great Britain | Aug. 13, 1931 |